US012633461B2

(12) United States Patent
Park et al.

(10) Patent No.: US 12,633,461 B2
(45) Date of Patent: May 19, 2026

(54) MULTILAYER ELECTRONIC COMPONENT

(71) Applicant: SAMSUNG ELECTRO-MECHANICS CO., LTD., Suwon-si (KR)

(72) Inventors: Yong Park, Suwon-si (KR); Jung Jin Park, Suwon-si (KR); Kwan Soo Park, Suwon-si (KR); Jong Ho Lee, Suwon-si (KR); Chang Ho Seo, Suwon-si (KR); Sun Mi Kim, Suwon-si (KR); Hyun Sik Chae, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 108 days.

(21) Appl. No.: 18/615,218

(22) Filed: Mar. 25, 2024

(65) Prior Publication Data

US 2025/0029786 A1     Jan. 23, 2025

(30) Foreign Application Priority Data

Jul. 21, 2023     (KR) ......................... 10-2023-0095536
Oct. 24, 2023     (KR) ......................... 10-2023-0142878

(51) Int. Cl.
*H01G 4/18*          (2006.01)
*H01G 4/30*          (2006.01)
*H01G 4/12*          (2006.01)

(52) U.S. Cl.
CPC ................. *H01G 4/18* (2013.01); *H01G 4/30* (2013.01); *H01G 4/1227* (2013.01)

(58) Field of Classification Search
CPC ........... H01G 4/1227; H01G 4/18; H01G 4/30
(Continued)

(56) References Cited

U.S. PATENT DOCUMENTS

2012/0262840 A1*  10/2012  Koizumi .................. H01G 4/12
                                                             361/321.2
2014/0301013 A1*  10/2014  Kim ......................... H01G 4/01
                                                             29/25.03
2024/0203651 A1    6/2024  Park et al.

FOREIGN PATENT DOCUMENTS

CN        113121980 A  *  7/2021  ................ C08J 5/18
KR    10-2023-0032725 A      3/2023
KR    10-2024-0092345 A      6/2024

OTHER PUBLICATIONS

Park, Yong; "Mussel-Inspired Ceramic Layer for Enhancement of Mechanical Properties"; Jun. 14, 2021; Korea Advanced Institute of Science and Technology (Year: 2021).*

* cited by examiner

*Primary Examiner* — Arun Ramaswamy
(74) *Attorney, Agent, or Firm* — Morgan, Lewis & Bockius LLP

(57)                ABSTRACT
A multilayer electronic component includes a body including a dielectric layer and first and second internal electrodes disposed alternately in a first direction with the dielectric layer interposed therebetween, and including first and second surfaces opposing each other in the first direction, third and fourth surfaces connected to the first and second surfaces and opposing each other in the second direction, and fifth and sixth surfaces connected to the first to fourth surfaces and opposing each other in the third direction; a side margin portion disposed on the fifth and sixth surfaces; and an external electrode disposed on the third and fourth surfaces, wherein the side margin portion includes polydopamine, and wherein an average size of the plurality of dielectric grains included in the side margin portion is different from an average size of the plurality of dielectric grains included in the dielectric layer.

20 Claims, 12 Drawing Sheets

(58) Field of Classification Search
USPC ..... 361/301.4, 311, 312, 321.1, 321.4, 321.5
See application file for complete search history.

FIRST
DIRECTION

SECOND
DIRECTION

THIRD
DIRECTION 111 110 112 121 122 tc

131

132 td te

FIRST
DIRECTION

SECOND
DIRECTION

I-I'

111   112   121   122

141

142

K2

K1

Ac

FIRST
DIRECTION

THIRD
DIRECTION tm   113

FIRST
DIRECTION

SECOND
DIRECTION

THIRD
DIRECTION

MULTILAYER ELECTRONIC COMPONENT

CROSS-REFERENCE TO RELATED APPLICATION(S)

This application claims benefit of priority to Korean Patent Application No. 10-2023-0142878 filed on Oct. 24, 2023 and Korean Patent Application No. 10-2023-0095536 filed on Jul. 21, 2023 in the Korean Intellectual Property Office, the disclosures of which are incorporated herein by reference in their entirety.

BACKGROUND

1. Technical Field

The present disclosure relates to a multilayer electronic component.

2. Description of Related Art

A multilayer electronic component (MLCC), a multilayer electronic component, may be a chip condenser mounted on the printed circuit boards of various electronic products including image display devices such as a liquid crystal display (LCD) and a plasma display panel (PDP), a computer, a smartphone, and a mobile phone, charging or discharging electricity therein. Such a multilayer ceramic capacitor may be used as a component of various electronic devices, as a multilayer ceramic capacitor may have a small size and high capacitance and may be easily mounted.

Recently, to assure capacitance per unit volume of a multilayer ceramic capacitor, a multilayer ceramic capacitor has been miniaturized, and accordingly, a thickness of a side margin portion to protect a capacitance forming portion for forming capacitance of the multilayer ceramic capacitor has been reduced. However, as a thickness of the side margin portion decreases, mechanical strength of the multilayer ceramic capacitor may weaken, which may cause cracks or brittle fractures in the multilayer ceramic capacitor. The cracks may become a path for external moisture to enter the multilayer ceramic capacitor, causing a decrease in moisture resistance reliability of the multilayer ceramic capacitor.

Accordingly, to prevent mechanical strength and moisture resistance reliability of a multilayer ceramic capacitor from being reduced, research to improve strength of the side margin portion may be necessary.

SUMMARY

An embodiment of the present disclosure is to provide a multilayer electronic component having improved mechanical strength and moisture resistance reliability.

According to an embodiment of the present disclosure, a multilayer electronic component includes a body including a dielectric layer and first and second internal electrodes disposed alternately in a first direction with the dielectric layer interposed therebetween, and including first and second surfaces opposing each other in the first direction, third and fourth surfaces opposing each other in a second direction and connected to the first and second surfaces, and fifth and sixth surfaces opposing each other in a third direction and connected to the first to fourth surfaces; a side margin portion disposed on the fifth and sixth surfaces; and an external electrode disposed on the third and fourth surfaces, wherein the side margin portion includes polydopamine, and wherein an average size of plurality of dielectric grains included in the side margin portion is different from an average size of plurality of dielectric grains included in the dielectric layer.

BRIEF DESCRIPTION OF DRAWINGS

The above and other aspects, features, and advantages of the present disclosure will be more clearly understood from the following detailed description, taken in combination with the accompanying drawings, in which:

FIG. 5A is a diagram illustrating chemical structure of dopamine hydrochloride;

FIG. 5B is a diagram illustrating chemical structures of polydopamine polymer;

FIG. 5C is a diagram illustrating chemical structure of nitrogen-doped carbonized polydopamine;

DETAILED DESCRIPTION

Figure 1:
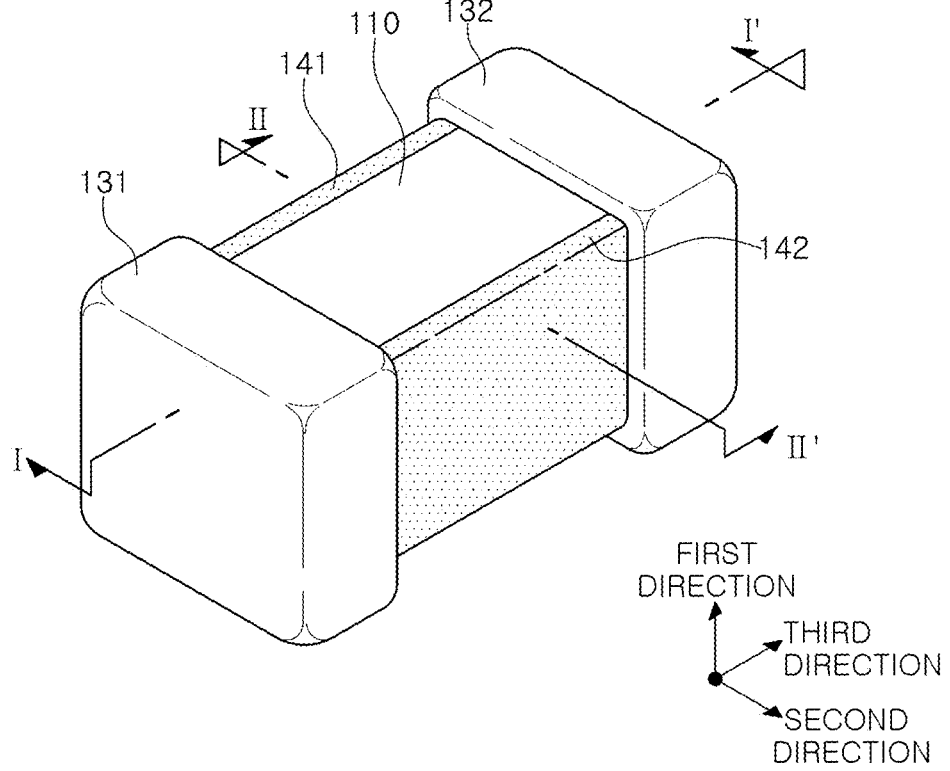
FIG. 1 is a perspective diagram illustrating a multilayer electronic component according to an embodiment of the present disclosure.

Hereinafter, embodiments of the present disclosure will be described as below with reference to the accompanying drawings.

These embodiments are described in sufficient detail to enable those skilled in the art to practice the invention. It is to be understood that the various embodiments of the invention, although different, are not necessarily mutually exclusive. For example, structures, shapes, and sizes described as examples in embodiments in the present disclosure may be implemented in another embodiment without departing from the spirit and scope of the present disclosure. Further, modifications of positions or arrangements of elements in embodiments may be made without departing from the spirit and scope of the present disclosure. The following detailed description is, accordingly, not to be taken in a limiting sense, and the scope of the present invention are defined only by appended claims, appropriately interpreted, along with the full range of equivalents to which the claims are entitled.

In the drawings, same elements will be indicated by same reference numerals. Also, redundant descriptions and detailed descriptions of known functions and elements which may unnecessarily make the gist of the present disclosure obscure will be omitted. In the accompanying drawings, some elements may be exaggerated, omitted or briefly illustrated, and the sizes of the elements do not necessarily reflect the actual sizes of these elements. The terms, "include," "comprise," "is configured to," or the like of the description are used to indicate the presence of features, numbers, steps, operations, elements, portions or combination thereof, and do not exclude the possibilities of combination or addition of one or more features, numbers, steps, operations, elements, portions or combination thereof.

In the drawings, the first direction may be defined as a thickness (T) direction, the second direction may be defined as a length (L) direction, and the third direction may be defined as a width (W) direction.

Multilayer Electronic Component

FIG. 1 is a perspective diagram illustrating a multilayer electronic component according to an embodiment.

Figure 2:
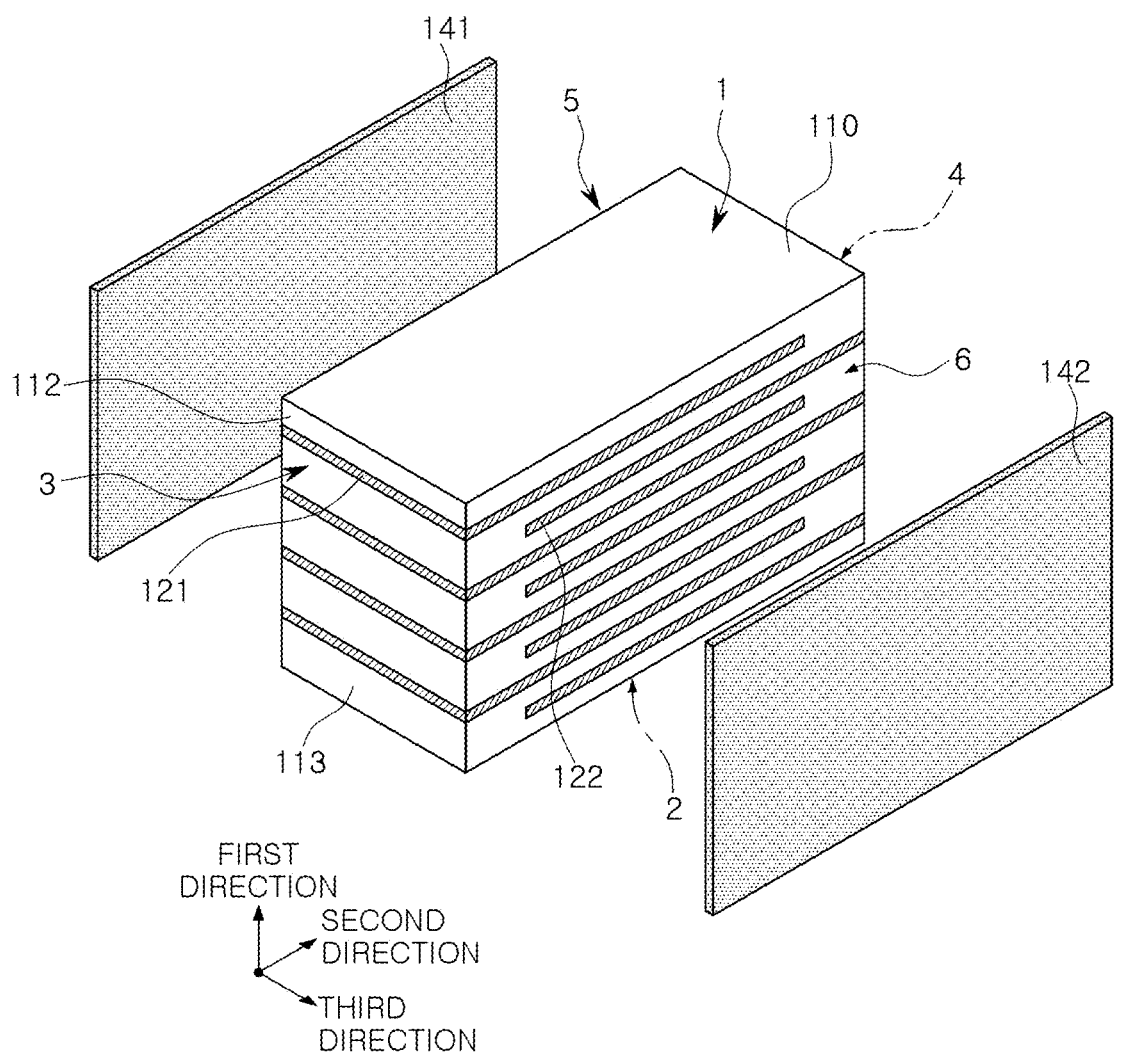
FIG. 2 is an exploded perspective diagram illustrating a body and side margin portion in FIG. 1.

FIG. 2 is an exploded perspective diagram illustrating a body and side margin portion in FIG. 1.

Figure 3:
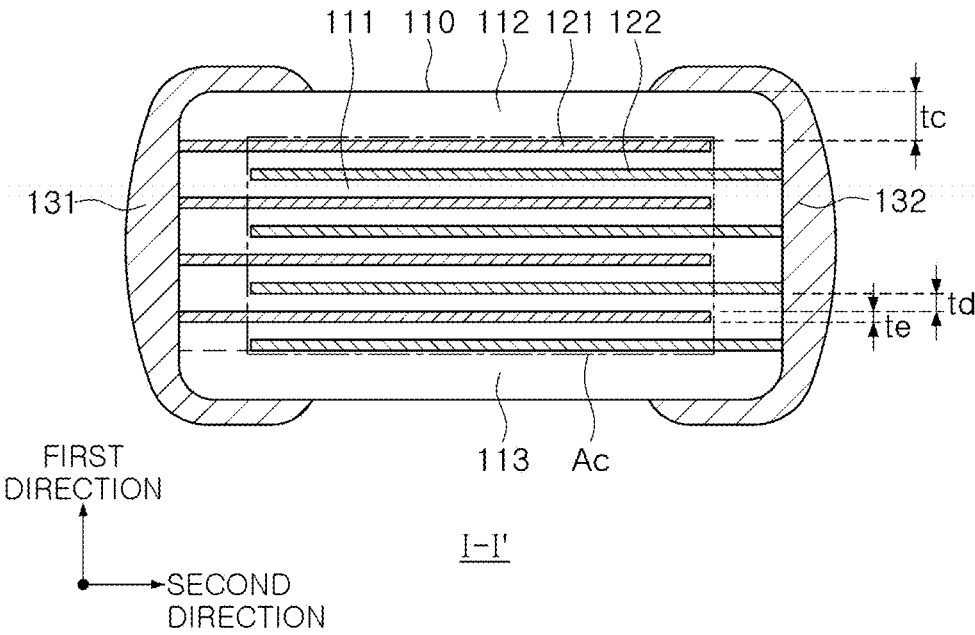
FIG. 3 is a cross-sectional diagram illustrating a cross-sectional surface, taken along line I-I' in FIG. 1.

FIG. 3 is a cross-sectional diagram illustrating a cross-sectional surface, taken along line I-I' in FIG. 1.

Figure 4:
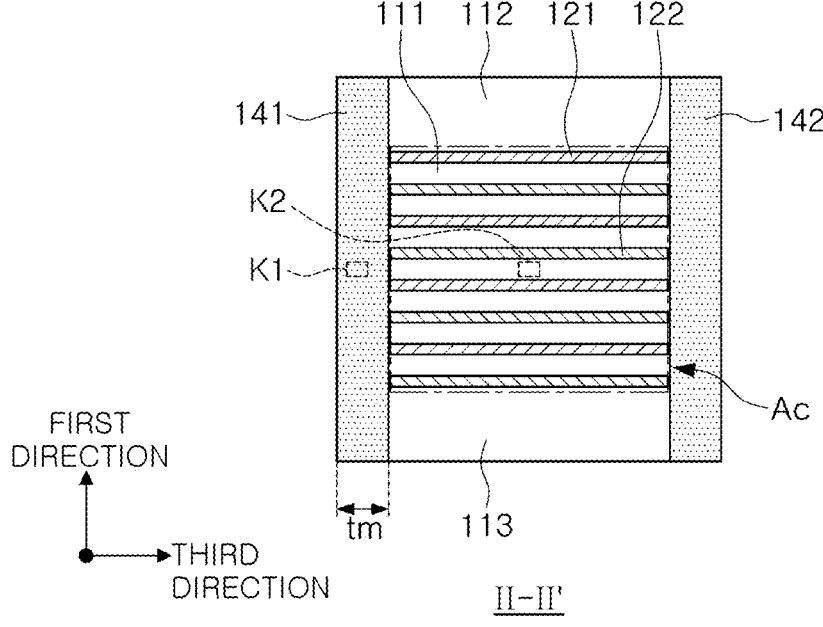
FIG. 4 is a cross-sectional diagram illustrating a cross-sectional surface, taken along line II-II' in FIG. 1.

FIG. 4 is a cross-sectional diagram illustrating a cross-sectional surface, taken along line II-II' in FIG. 1.

Figures 5A, 5B, 5C:
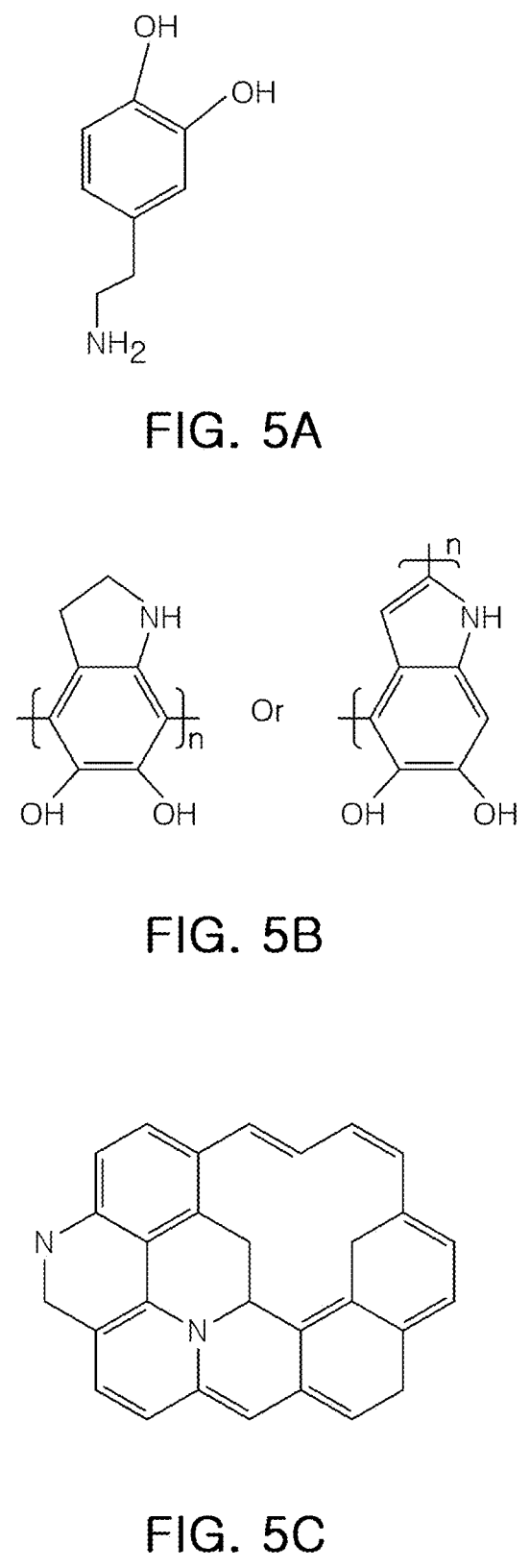
Figure 6:
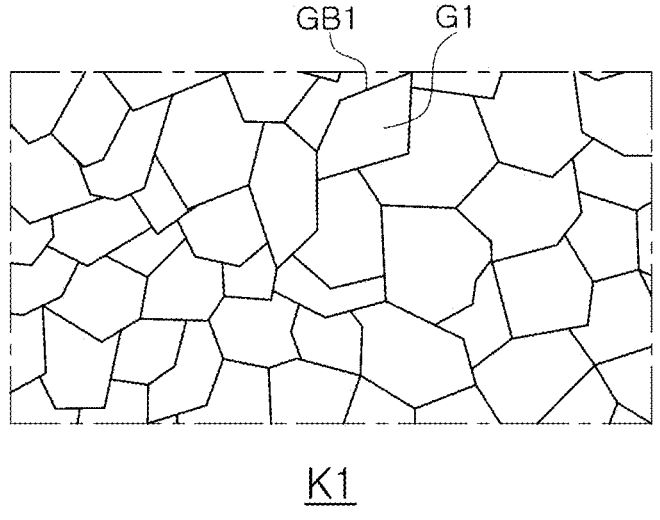
FIG. 6 is an enlarged diagram illustrating region K1 in FIG. 4.

FIG. 5A is a diagram illustrating chemical structure of dopamine hydrochloride;

FIG. 5B is a diagram illustrating chemical structures of polydopamine polymer;

FIG. 5C is a diagram illustrating chemical structure of nitrogen-doped carbonized polydopamine;

FIG. 6 is an enlarged diagram illustrating region K1 in FIG. 4.

Figure 7:
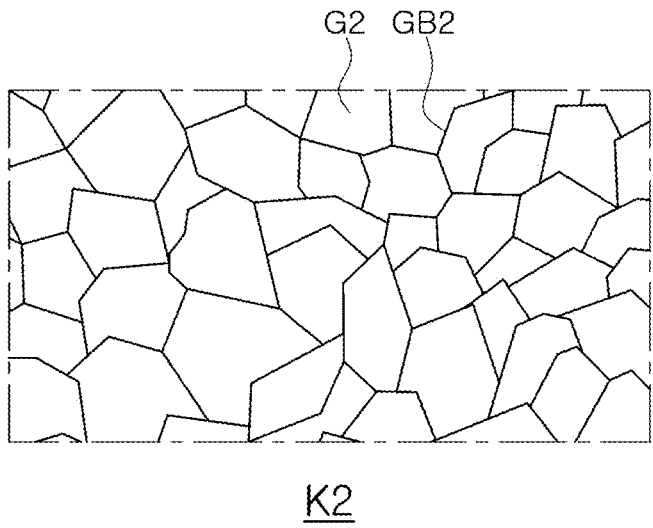
FIG. 7 is an enlarged diagram illustrating region K2 in FIG. 4.

FIG. 7 is an enlarged diagram illustrating region K2 in FIG. 4.

Figure 8:
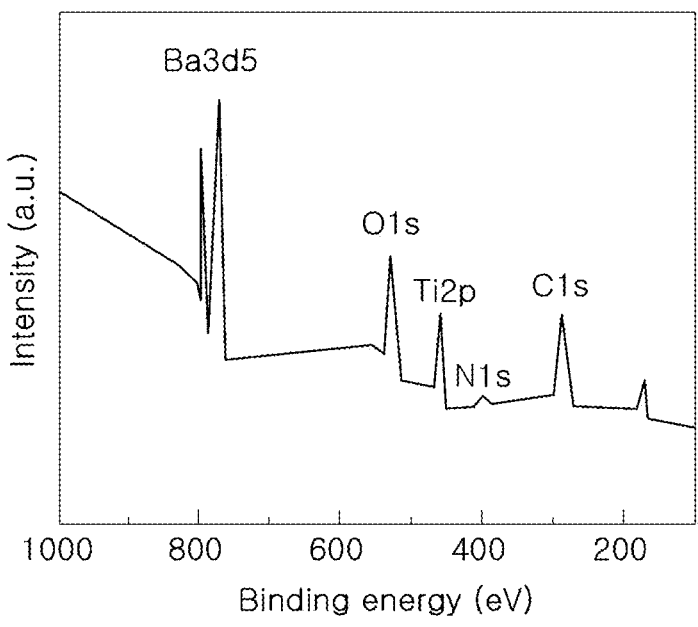
FIG. 8 is a graph indicating results of analyzing a side margin portion of a multilayer electronic component using X-ray photoelectron spectroscopy (XPS) according to an embodiment of the present disclosure.

FIG. 8 is a graph indicating results of analyzing a side margin portion of a multilayer electronic component according to an embodiment using X-ray photoelectron spectroscopy (XPS).

Figure 9:
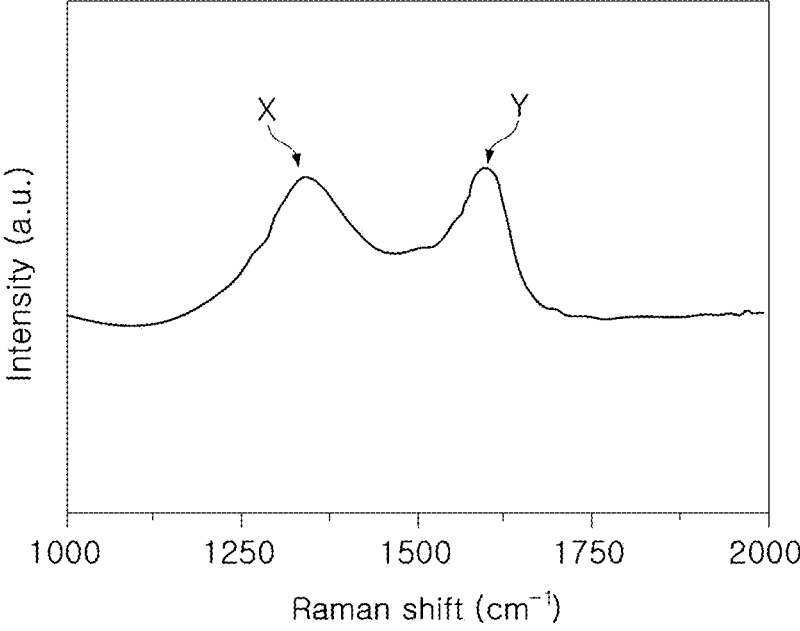
FIG. 9 is a graph indicating results of analyzing a side margin portion of a multilayer electronic component using Raman analysis according to an embodiment of the present disclosure.

FIG. 9 is a graph indicating results of analyzing a side margin portion of a multilayer electronic component according to an embodiment using Raman analysis.

Hereinafter, a multilayer electronic component according to an embodiment will be described in greater detail with reference to FIGS. 1 to 6. A multilayer ceramic capacitor will be described as an example of a multilayer electronic component, but an embodiment thereof is not limited thereto, and the multilayer ceramic capacitor may be applied to various multilayer electronic components, such as an inductor, a piezoelectric element, a varistor, or a thermistor.

A multilayer electronic component 100 may include a body 110, side margin portions 141 and 142, and external electrodes 131 and 132.

The shape of the body 110 may not be limited to any particular shape, but as illustrated, the body 110 may have a hexahedral shape or a shape similar to a hexahedral shape. Due to reduction of ceramic powder included in the body 110 during a firing process or polishing of corners, the body 110 may not have an exact hexahedral shape formed by linear lines but may have a substantially hexahedral shape.

The body 110 may have first and second surfaces 1 and 2 opposing each other in the first direction, third and fourth surfaces 3 and 4 connected to the first and second surfaces 1 and 2 and opposing in the second direction, and fifth and sixth surfaces 5 and 6 connected to the first and second surfaces 1 and 2 and the third and fourth surfaces 3 and 4 and opposing each other in the third direction.

The body 110 may include the first and second internal electrodes 121 and 122 disposed alternately in the first direction with the dielectric layer 111 and the dielectric layer 111 therebetween. The plurality of dielectric layers 111 forming the body 110 may be in a fired state, and a boundary between the adjacent dielectric layers 111 may be integrated with each other such that the boundary may not be distinct without using a scanning electron microscope (SEM).

For example, the dielectric layer 111 may include a perovskite-type compound represented by $ABO_3$ as a main component. Perovskite compounds represented by $ABO_3$ may be, for example, $BaTiO_3$, $(Ba_{1-x}Ca_x)TiO_3$ $(0<x<1)$, $Ba(Ti_{1-y}Ca_y)O_3$ $(0<y<1)$, $(Ba_{1-x}Ca_x)(Ti_{1-y}Zr_y)O_3$ $(0<x<1, 0<y<1)$ or $Ba(Ti_{1-y}Zr_y)O_3$ $(0<y<1)$.

The dielectric layers 111 and the internal electrodes 121 and 122 may be alternately laminated. That is, the first internal electrode 121 and the second internal electrode 122, which are a pair of electrodes with different polarities, may be disposed to oppose each other with the dielectric layer 111 interposed therebetween. The first internal electrode 121 and the second internal electrode 122 may be electrically separated from each other by the dielectric layer 111 interposed therebetween.

The first internal electrode 121 may be connected to the third surface, fifth surface and sixth surface 3, 5, and 6, and may be disposed to be spaced apart from fourth surface 4. The second internal electrode 122 may be connected to the fourth, fifth and sixth surfaces 4, 5, and 6, and may be spaced apart from the third surface 3.

A conductive metal included in the internal electrodes 121 and 122 may be one or more of Ni, Cu, Pd, Ag, Au, Pt, Sn, W, Ti and alloys thereof, and more preferably, may include Ni, but an embodiment thereof is not limited thereto.

An average thickness td of the dielectric layer 111 and an average thickness te of the internal electrodes 121 and 122 do not need to be limited to any particular example. The average thickness td of the dielectric layer 111 may be, for example, 0.1 μm to 10 μm. The average thickness te of the internal electrodes 121 and 122 may be, for example, 0.1 μm to 3.0 μm. Also, the average thickness td of the dielectric layer 111 and the average thickness of the internal electrodes 121 and 122 may be arbitrarily determined depending on desired properties or purposes. For example, in the case of high-voltage electronic components to obtain miniaturization and high capacitance, the average thickness td of the dielectric layer 111 may be less than 2.8 μm, and the average thickness te of the internal electrodes 121 and 122 may be less than 1 μm. Also, in the case of small IT electronic components to obtain miniaturization and high capacitance, the average thickness td of the dielectric layer 111 may be 0.4 μm or less, and the average thickness te of the internal electrodes 121 and 122 may be 0.4 μm or less.

The average thickness td of the dielectric layer 111 and the average thickness te of the internal electrodes 121 and 122 may indicate sizes of the dielectric layer 111 and the internal electrodes 121 and 122 in the first direction, respectively. The average thickness td of the dielectric layer 111 and the average thickness te of the internal electrodes 121 and 122 may be measured by scanning a cross-section of the body 110 in the first and second directions using a scanning electron microscope (SEM) with a magnification of 10,000. More specifically, the average thickness td of the dielectric layer 111 may be measured from the thicknesses of the dielectric layer 111 at 30 points spaced apart from each other by an equal distance in the second direction. Also, the average thickness te of internal electrodes 121 and 122 may be measured by measuring the thickness at multiple points of one internal electrode 121 and 122, for example, 30 points spaced apart from each other by an equal distance in the second direction. The 30 points spaced apart from each other by an equal distance may be designated in the capacitance forming portion Ac. By measuring the average value after performing the average value measurements on ten dielectric layers 111 and 10 internal electrodes 121 and 122, respectively, the average thickness td of the dielectric layer 111 and the average thickness te of the internal electrodes 121 and 122 may be further generalized.

The body 110 may be disposed in the body 110, and may include a capacitance forming portion Ac including first and second internal electrodes 121 and 122 disposed alternately with the dielectric layer 111 therebetween, and a first cover portion 112 and a second cover portion 113 disposed on both surfaces of the capacitance forming portion Ac opposing each other in the first direction. The cover portions 112 and 113 may basically prevent damage to the internal electrode due to physical or chemical stress. The cover portions 112 and 113 may be configured similarly to the dielectric layer 111 other than the configuration in which an internal electrode is not included.

The average thickness tc of the cover portions 112 and 113 does not need to be limited to any particular example. That is, the average thickness tc of the cover portions 112 and 113 may be arbitrarily determined depending on desired properties or purposes.

For example, for miniaturization and high capacitance of multilayer electronic components, an average thickness tc of the cover portions 112 and 113 may be 300 μm or less, 100 μm or less, 30 μm or less, or 20 μm or less, but an embodiment thereof is not limited. Thereto. Here, the average thickness tc of the cover portions 112 and 113 may indicate an average thickness of each of the first cover portion 112 and the second cover portion 113.

The average thickness tc of the cover portions 112 and 113 may indicate an average size of the cover portions 112 and 113 in the first direction, and may be an average value of a size in the first direction measured at five points at equal intervals in the second direction in cross-sections of the body 110 in the first and second direction.

The side margin portions 141 and 142 may be disposed on the fifth and sixth surfaces 5 and 6 of the body 110. Specifically, the multilayer electronic component 100 according to an embodiment may include a first side margin portion 141 disposed on the fifth surface 5 and a second side margin portion 142 disposed on the sixth surface 6. The side margin portions 141 and 142 may have components similar to those of the dielectric layer 111 other than the configuration in which the internal electrodes 121 and 122 are not included. That is, the side margin portions 141 and 142 may include a perovskite-type compound represented by $ABO_3$ as a main component.

An average thickness tm of the side margin portions 141 and 142 does not need to be limited to any particular example. That is, the average thickness tm of the side margin portions 141 and 142 may be arbitrarily determined depending on desired properties or purposes. For example, for miniaturization and high capacitance of multilayer electronic components, the average thickness tm of the side margin portions 141 and 142 may be 100 μm or less, 20 μm or less, or 15 μm or less, but an embodiment thereof is not limited thereto. Here, the average thickness tm of the side margin portions 141 and 142 may indicate an average thickness of each of the first side margin portion 141 and the second side margin portion 142.

The average thickness tm of the side margin portions 141 and 142 may indicate an average size of the side margin portions 141 and 142 in the third direction, and may be an average value of a thickness in the third direction, measured at five points at equal intervals in the first direction in cross-sections of the multilayer electronic component 100 in the first and third direction, passing through a center of the body 110 in the second direction.

The external electrodes 131 and 132 may be disposed externally of the body 110 and may be connected to the internal electrodes 121 and 122. The external electrodes 131 and 132 may be disposed on the third surface and fourth surface 3 and 4 of the body 110, and may extend to a portion of the first, second, fifth and sixth surfaces 1, 2, 5, and 6. The external electrodes 131 and 132 may include a first external electrode 131 connected to the first internal electrode 121 and the second external electrode 132 connected to the second internal electrode 122.

The external electrodes 131 and 132 may include a first electrode layer disposed on the third surface and fourth surface 3 and 4 of the body 110 and connected to the internal electrodes 121 and 122, and a second electrode layer disposed on the first electrode layer.

The first electrode layer may be formed by dipping the third surface and fourth surfaces 3 and 4 of the body 110 into a conductive paste for external electrodes including conductive metal and glass and firing. The conductive metal included in the first electrode layer may include Cu, Ni, Pd, Pt, Au, Ag, Pb, and/or alloys including the same, but an embodiment thereof is not limited thereto.

Meanwhile, the first electrode layer may include only a layer including metal and glass, but an embodiment thereof is not limited thereto, and the first electrode layer may have a multilayer structure. For example, the first electrode layer may include a first layer including metal and glass, and a second layer disposed on the first layer and including metal and resin.

A metal included in the second layer is not limited to any particular example and may include one or more selected from a group consisting of Ni, Cu, Pd, Ag, Au, Pt, Sn, W, Ti and alloys thereof. Resin included in the second layer may secure adhesion and may act as shock absorber. The resin is not limited to any particular example, and resin having bonding properties and shock absorption properties and mixed with metal powder to form a paste may be used. For example, the resin may include one or more types of resin selected from among epoxy resin, acrylic resin, ethyl cellulose, or the like.

The second electrode layer may improve mounting properties. The type of the second electrode layer is not limited to any particular example, and may be a plating layer including Ni, Sn, Pd, and/or an alloy including the same, and may be formed as a plurality of layers. The second electrode layer may be, for example, a Ni plating layer or a Sn plating layer, or may be formed by sequentially forming a Ni plating layer and a Sn plating layer. Also, the second electrode layer may include a plurality of Ni plating layer and/or a plurality of Sn plating layer.

In the drawing, the multilayer electronic component 100 may have two external electrodes 131 and 132, but an embodiment thereof is not limited thereto, and the number and the shape of the external electrodes 131 and 132 may change depending on the shape of the internal electrodes 121 and 122 or other purposes.

According to an embodiment, the side margin portions 141 and 142 may include polydopamine. Polydopamine may be a polymer of dopamine. Polydopamine, formed by self-polymerization of dopamine, has covalent catechol and imine functional groups and may form strong bonds with both inorganic materials such as ceramic powder and organic materials such as binders.

As will be described later, dopamine hydrochloride illustrated in FIG. 5A may be added to the side margin portion forming sheet for forming the side margin portions 141 and 142 of the multilayer electronic component 100 according to an embodiment. Dopamine hydrochloride added to a sheet for forming the side margin portion may form polydopamine polymer illustrated in FIG. 5B through polymerization. A sheet for forming the side margin portion may form a strong bond with the ceramic powder or binder included in the sheet for forming the side margin portion by including polydopamine polymer, and accordingly, adhesive strength of the sheet for forming the side margin portion may be improved. Accordingly, when the sheet for forming the side margin portion is pressed and adhered to a side surface of the ceramic chip, which will be described later, defects such as peeling of a sheet for forming the side margin portion from the ceramic chip may be prevented.

The entirety or a portion of polydopamine polymer included in a sheet for forming the side margin portion may be converted to nitrogen-doped carbonized polydopamine illustrated in FIG. 5C through a firing process for forming the body 110 and the side margin portions 141 and 142 of the multilayer electronic component 100. In an embodiment, at least a portion of polydopamine included in the side margin portions 141 and 142 may be nitrogen-doped carbonized polydopamine. The nitrogen-doped carbonized polydopamine included in the side margin portions 141 and 142 may be a two-dimensional material which may improve an elastic modulus and toughness of the side margin portions 141 and 142, and accordingly, spread of cracks created in the side margin portions 141 and 142 may be suppressed. Accordingly, mechanical strength of the multilayer electronic component 100 may be improved, and ultimately the moisture resistance reliability of the multilayer electronic component 100 may be improved.

Meanwhile, a color of the side margin portions 141 and 142 may be darkened due to carbonized polydopamine included in the side margin portions 141 and 142. In an embodiment, RGB values measured at the side margin portions 141 and 142 may satisfy $71 \leq R \leq 79$, $71 \leq G \leq 79$, and $64 \leq B \leq 72$. The R, G, and B values of RGB values measured on external surfaces of the side margin portions 141 and 142 may be smaller than an R value, G value, and B value of RGB values measured on external surfaces of the cover portions 112 and 113, respectively, but an embodiment thereof is not limited thereto. The R, G, and B values may be measured by a digital microscope. Other methods and/or tools appreciated by one of ordinary skill in the art, even if not described in the present disclosure, may also be used.

Hereinafter, the side margin portion and the dielectric layer will be described in more detail with reference to FIGS. 6 and 7. FIG. 6 is an enlarged view of a portion of the first side margin portion 141. However, since the configurations of the first side margin portion 141 and the second side margin portion 142 are substantially the same, the descriptions below may include both the first side margin portion 141 and the second side margin portion 142.

According to an embodiment, an average size of the plurality of dielectric grains G1 included in the side margin portion 141 may be different from an average size of the plurality of dielectric grains G2 included in the dielectric layer 111. Hereinafter, the dielectric grain and the grain boundary included in the side margin portion 141 may be defined as a first dielectric grain and a first grain boundary, respectively, and the dielectric grain and the grain boundary included in dielectric layer 111 may be defined as a second dielectric grain and a second grain boundary, respectively.

According to an embodiment, the side margin portion 141 may be formed by pressurizing and firing a sheet for forming the side margin portion separately from the ceramic green sheet forming the dielectric layer. Accordingly, a particle diameter of the first ceramic powder added to the ceramic green sheet to form the dielectric layer 111 and a particle diameter of the second ceramic powder added to the sheet for forming the side margin portion to form the side margin portion 141 may be different from each other. By varying particle diameters of the first and second ceramic powders, an average size of the plurality of first dielectric grain G1 and an average size of the plurality of second dielectric grain G2 may be adjusted to be different after firing. Also, the nitrogen-doped carbonized polydopamine included in the side margin portion 141 may suppress a grain growth of the first dielectric grain G1, and accordingly, the average size of the plurality of first dielectric grains G1 and the average size of the plurality of second dielectric grains G2 may be different.

The side margin portion 141 may protect the dielectric layer 111 from external moisture or external shocks, and the dielectric layer 111 may implement capacitance of the multilayer electronic component 100. That is, according to an embodiment, to implement desired electrical properties or reliability, the average size of the plurality of first dielectric grain G1 and the average size of the plurality of second dielectric grain G2 may be different from each other.

For example, to improve capacitance of the multilayer electronic component 100, the average size of the plurality of second dielectric grains G2 included in the dielectric layer 111 may be greater than the average size of the plurality of first dielectric grains G1 included in the side margin portion 141. Alternatively, to improve reliability of the multilayer electronic component 100, the average size of the plurality of second dielectric grains G2 included in the dielectric layer 111 may be smaller than the average size of the plurality of first dielectric grains G1 included in the side margin portion 141.

The average size of the plurality of first dielectric grains G1 included in the side margin portion 141 does not need to be limited to any particular example, but may be, for example, 160 nm or more and 190 nm or less.

The average size of the plurality of first dielectric grains G1 included in the side margin portion 141 may be, for example, an average value of the dielectric grain size of dielectric grains obtained by obtaining an image of a central region (for example, region K1 in FIG. 4) of the side margin portion 141 magnified 50,000 times from cross-sections of the multilayer electronic component 100 in the first and second directions cut from a center in the third direction using a scanning electron microscope (SEM), and analyzing an image using an image analysis program, for example, Zootos Program from Zootos.

Also, the average size of the plurality of second dielectric grains G2 included in the dielectric layer 111 may be, for example, an average value of dielectric grain sizes, obtained by obtaining an image, magnified 50,000 times, of the dielectric layer 111 disposed in a central region (for example, region K2 in FIG. 4) of the capacitance forming portion Ac from cross-sections of multilayer electronic component 100 in the first and second direction cut from a center in the third direction using a scanning electron microscope (SEM), and analyzing an image using an image analysis program, for example, Zootos Program from Zootos.

In an embodiment, polydopamine included in the side margin portion 141 may be disposed at a grain boundary GB1. Polydopamine disposed at the first grain boundary GB1 may effectively block the spread of cracks. Also, since nitrogen-doped carbonized polydopamine is hydrophobic, when nitrogen-doped carbonized polydopamine is present at the first grain boundary GB1, the material may work as a barrier against moisture penetration. The presence of polydopamine and/or nitrogen-doped carbonized polydopamine at the grain boundary GB1 may be indicated by the presence of N as determined by SEM-EDS or X-ray photoelectron spectroscopy (XPS). Other methods and/or tools appreciated by one of ordinary skill in the art, even if not described in the present disclosure, may also be used.

Referring to FIG. 8, in an embodiment, when the side margin portions 141 and 142 are analyzed using X-ray photoelectron spectroscopy (XPS), an N1s peak and a C1s peak may be detected. When the side margin portions 141 and 142 include nitrogen-doped carbonized polydopamine, an N1s peak may be further detected in addition to Ba3d5, O1s, Ti2p, and C1s peaks. That is, when the N1s and C1s peaks are detected simultaneously during XPS analysis, it may be determined that nitrogen-doped carbonized polydopamine may be present in the side margin portions 141 and 142. Meanwhile, intensity of the N1s peak may have a maximum value at a binding energy of 395 eV to 405 eV, and intensity of the C1s peak may have a maximum value at a binding energy of 280 eV or more and 290 eV or less, but an embodiment thereof is not limited thereto.

XPS analysis of the side margin portions 141 and 142 may be performed on external surfaces of the side margin portions 141 and 142, but an embodiment thereof is not limited thereto, and the analysis may also be performed on cross-sections in the first and second direction, polished up to a central portion of the multilayer electronic component 100 in the third direction.

Referring to FIG. 9, in an embodiment, during Raman analysis of the side margin portions 141 and 142, the first peak X may be detected at a Raman shift of 1360 cm$^{-1}$ to 1380 cm$^{-1}$, and the second peak Y may be detected at a Raman shift of 1610 cm$^{-1}$ to 1630 cm$^{-1}$. During Raman analysis of the side margin portions 141 and 142, the first peak X and the second peak Y may appear simultaneously because the side margin portions 141 and 142 may have a carbonized polydopamine structure having a two-dimensional structure.

In an embodiment, a ratio of maximum intensity of the first peak X to maximum intensity of the second peak Y may be 0.01 or more and 1.50 or less. The ratio of maximum intensity of first peak X to maximum intensity of second peak Y may vary depending on the degree of nitrogen doping or defects in the carbonized polydopamine.

In an embodiment, a full width at half maximum of the first peak may be 80 cm$^{-1}$ or more 90 cm$^{-1}$ or less, and a full width at half maximum of the second peak Y may be 100 cm$^{-1}$ or more 110 cm$^{-1}$ or less. A full width at half maximum may refer to a width of the peak when intensity is full width at half maximum intensity of the peak.

Raman analysis of the side margin portions 141 and 142 may be performed on external surfaces of the side margin portions 141 and 142, but an embodiment thereof is not limited thereto, and may also be performed on cross-sections in the first and second direction polished up to a central portion of the multilayer electronic component 100 in the third direction.

In an embodiment, the dielectric layer 111 may not include (may be free of) polydopamine. When the dielectric layer 111 includes polydopamine, mechanical strength of the dielectric layer 111 may be improved, but when polydopamine is included in the dielectric layer 111, which is directly related to electrical properties of the multilayer electronic component 100, side effects, such as deterioration of a breakdown voltage of the multilayer electronic component 100 may occur.

When the dielectric layer 111 does not include polydopamine, nitrogen may not be detected in the dielectric layer 111. Also, when analyzing the dielectric layer 111 using X-ray photoelectron spectroscopy (XPS), the N1s peak may not be detected. Also, when performing Raman analysis on dielectric layer 111, a peak may not be detected in at least one of the Raman shift of 1360 cm$^{-1}$ to 1380 cm$^{-1}$ and the Raman shift of 1610 cm$^{-1}$ to 1630 cm$^{-1}$.

In an embodiment, the dielectric layer 111 may include a smaller content of polydopamine than the content of polydopamine included in the side margin portions 141 and 142. When polydopamine is added to the dielectric layer 111 to improve mechanical strength of the dielectric layer 111, a smaller content of polydopamine than the content of polydopamine included in the side margin portions 141 and 142 may be added to prevent electrical properties of the multilayer electronic component 100 from deteriorating. When the dielectric layer 111 includes polydopamine, the polydopamine may be disposed at the second grain boundary GB2 of the dielectric layer 111.

When the dielectric layer 111 includes polydopamine, during Raman analysis of the dielectric layer 111, the third peak may be detected at a Raman shift of 1360 cm$^{-1}$ to 1380 cm$^{-1}$, and a fourth peak may be detected at a Raman shift of 1610 cm$^{-1}$ to 1630 cm$^{-1}$. As the dielectric layer 111 includes less polydopamine than the content of polydopamine included in the side margin portions 141 and 142, intensity of the third peak may be lower than intensity of the first peak X, and intensity of the fourth peak may be lower than intensity of the second peak Y, but an embodiment thereof is not limited thereto.

Figure 10:
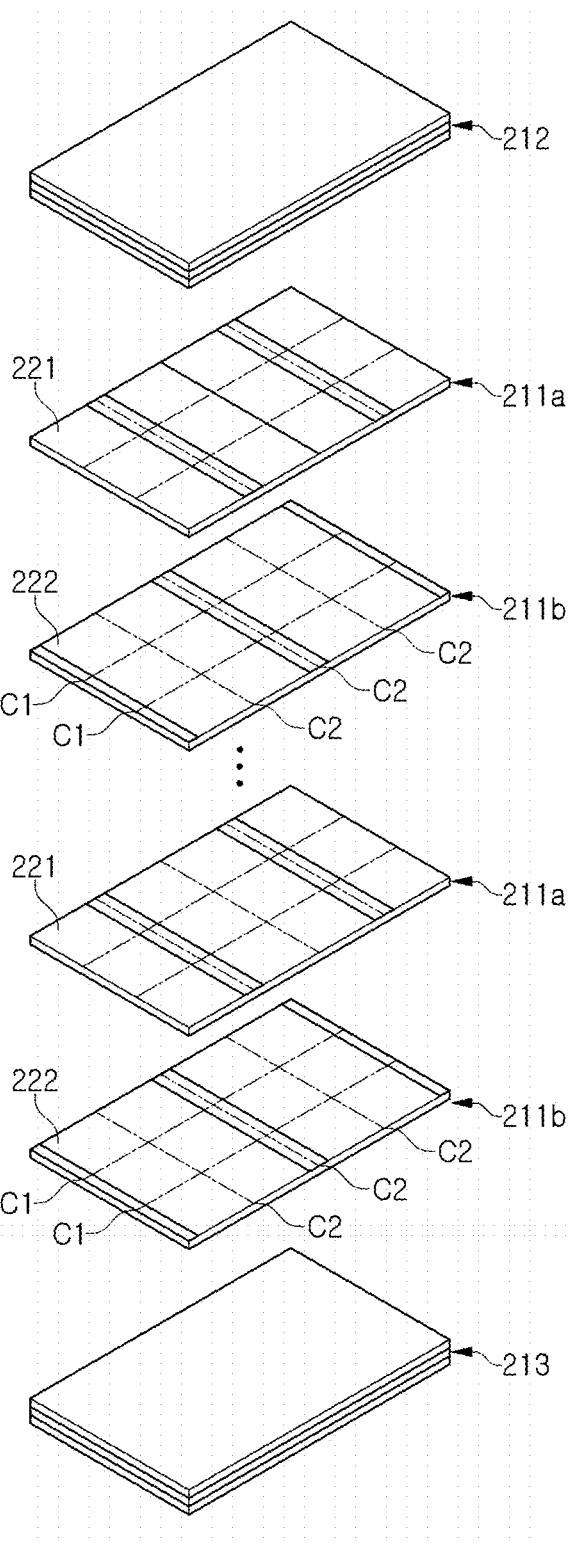
FIGS. 10 to 12 are perspective diagrams illustrating a method of manufacturing a multilayer electronic component according to an embodiment of the present disclosure.
Figure 11:
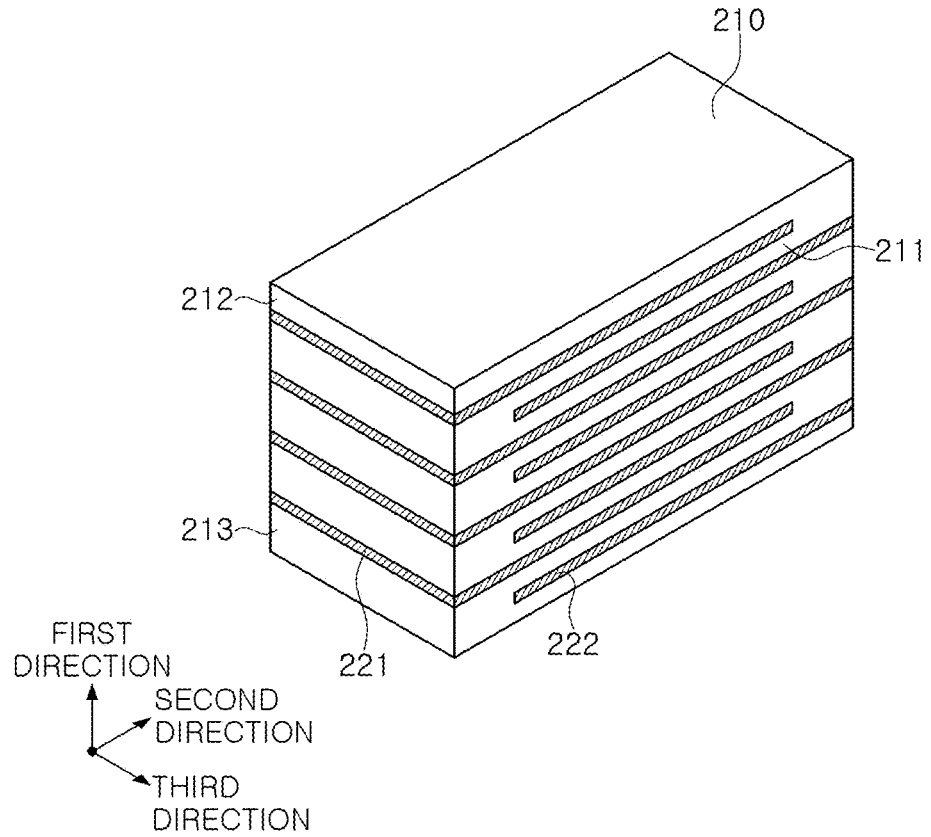
Figure 12:
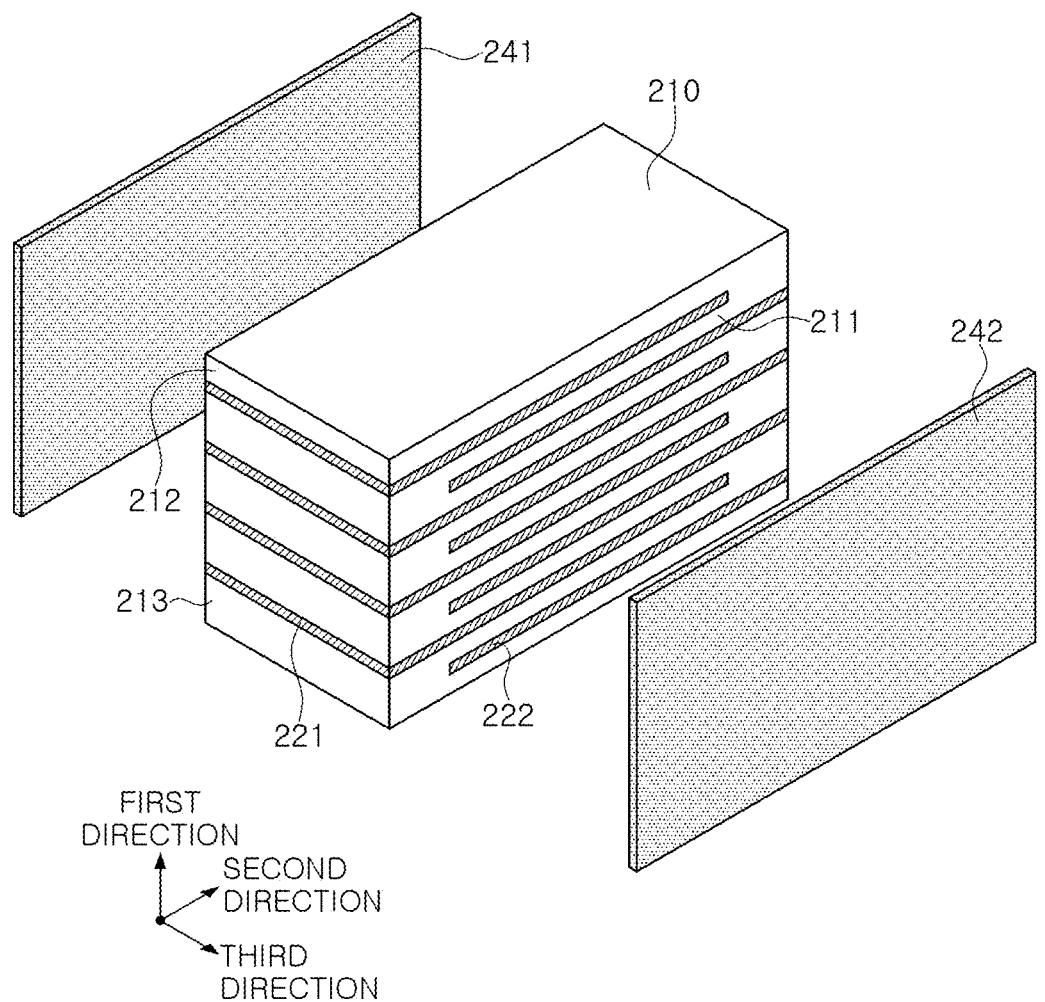

FIGS. 10 to 12 are perspective diagrams illustrating a method of manufacturing a multilayer electronic component according to an embodiment. Hereinafter, an example of a method of manufacturing the multilayer electronic component 100 according to an embodiment will be described with reference to FIGS. 10 to 12.

First, a first ceramic slurry including first ceramic powder, an organic solvent and a binder may be prepared, and a ceramic green sheet may be prepared by applying and drying the first ceramic slurry on a carrier film. The first ceramic powder is not limited to any particular example as long as sufficient electrostatic capacitance may be obtained, and for example, barium titanate-based material, lead composite perovskite-based material, or strontium titanate-based material may be used. Examples of the ceramic powder may include $BaTiO_3$, $(Ba_{1-x}Ca_x)TiO_3$ $(0<x<1)$, $Ba(Ti_{1-y}Ca_y)O_3$ $(0<y<1)$, $(Ba_{1-x}Ca_x)(Ti_{1-y}Zr_y)O_3$ $(0<x<1,\ 0<y<1)$ or $Ba(Ti_{1-y}Zr_y)O_3$ (0<y<1) in which Ca (calcium) and Zr (zirconium) are partially dissolved in $BaTiO_3$.

Thereafter, as illustrated in FIG. 10, a laminate may be manufactured by laminating a first ceramic green sheet 211a and a second ceramic green sheet 211b for forming the capacitance forming portion Ac, and a first cover portion forming sheet 212 and a second cover portion forming sheet 213 for forming the cover portions 112 and 113.

A first internal electrode pattern 221 may be formed on the first ceramic green sheet 211a to form the first internal electrode 121, and a second internal electrode pattern 222 may be formed on the second ceramic green sheet 211b to form the second internal electrode 122. Specifically, a plurality of first internal electrode patterns 221 arranged at predetermined intervals may be formed on the first ceramic green sheet 211a. The plurality of first internal electrode patterns 221 may have a band shape and may be formed parallel to each other. Also, a plurality of second internal electrode patterns 222 arranged at predetermined intervals may be formed on the second ceramic green sheet 211b. The plurality of second internal electrode patterns 222 may have a strip shape and may be formed parallel to each other. The internal electrode patterns 221 and 222 may be formed by printing a conductive paste for an internal electrode including metal powder, binder, solvent, or the like, using a screen printing method or a gravure printing method.

Meanwhile, the sheets 212 and 213 for forming the cover portion may have a structure similar to the ceramic green sheet 211, but an internal electrode pattern may not be formed on the sheets 212 and 213 for forming the cover portion.

The prepared ceramic laminate may be pressed and may be cut along cutting lines C1 and C2. Specifically, the ceramic laminate may be cut along the plurality of first cutting line C1 parallel to the second direction and a plurality of second cutting line C2 parallel to the third direction. The cutting lines C1 and C2 may cross the first internal electrode pattern 221 and the second internal electrode pattern 222.

Accordingly, the ceramic chip 210 illustrated in FIG. 11 may be manufactured. In the ceramic chip 210, the cut-out first internal electrode pattern 221 and the cut-out second internal electrode pattern 222 may be disposed alternately with the cut-out ceramic green sheet 211 therebetween. The cut-out first internal electrode pattern 221 and the cut-out second internal electrode pattern 222 may be exposed on both surfaces of the ceramic chip 210 opposing each other in the third direction.

Thereafter, sheets 241 and 242 for forming the side margin portion may be prepared. The sheets 241 and 242 for forming the side margin portion may be manufactured in a similar manner to the ceramic green sheet 211 described above, and may be manufactured using a second ceramic slurry mixed with dopamine hydrochloride, second ceramic powder, organic solvent and binder. The content of dopamine hydrochloride for a total of 100 parts by weight of the second ceramic slurry for forming the sheets 241 and 242 for forming the side margin portion may be greater than 0 parts by weight and 2 parts by weight or less preferably.

Thereafter, as illustrated in FIG. 12, the sheets 241 and 242 for forming the side margin portion may be pressed and adhered to both surfaces of the ceramic chip 210 in the third direction. In this case, polydopamine polymer formed through polymerization may improve adhesion of the sheets 241 and 242 for forming the side margin portion, thereby preventing defects occurring between the ceramic chip 210 and the sheets 241 and 242 for forming the side margin portion.

Thereafter, the ceramic chip 210 to which the side margin portion sheets 241 and 242 are attached may be fired to form the body 110 and the side margin portions 141 and 142 illustrated in FIG. 2. It may not be necessary to specifically limit a firing temperature, but for example, the firing may be performed at a temperature of 1100° C. or more and 1300° C. or less. Also, before firing the ceramic chip 210, a binder removal process or barrel polishing process may be performed if desired.

Thereafter, external electrodes 131 and 132 may be formed. First, the first electrode layer may be formed by dipping the body 110 on which the side margin portions 141 and 142 are formed into a conductive paste including metal powder and glass and firing. Meanwhile, when the first electrode layer includes a first layer including metal and glass and a second layer disposed on the first layer and including metal and resin, the second layer may be formed by applying and drying a conductive resin composition including metal powder and resin on the first layer, and curing-heat treatment at a temperature of 250° C. to 550° C.

Thereafter, a second electrode layer may be formed on the first electrode layer. It may not be necessary to specifically limit the method of forming the second electrode layer, and for example, electrolytic plating and/or electroless plating may be used.

However, the above-described manufacturing method may be an example, and the method of manufacturing the multilayer electronic component 100 is not limited to the above-described manufacturing method.

Experimental Example

<Tape Test>

Sample chips of embodiments and comparative examples were prepared through the above-described manufacturing method. The sample chip in the tape test was a ceramic chip having a sheet for forming a side margin portion attached before firing. In the embodiment, 1 part by weight of dopamine hydrochloride was added to the second ceramic slurry to form a sheet for forming the side margin portion, as compared to 100 parts by weight of the total second ceramic slurry. In the comparative example, dopamine hydrochloride was not added to the second ceramic slurry to form a sheet for forming the side margin portion.

Figure 13:
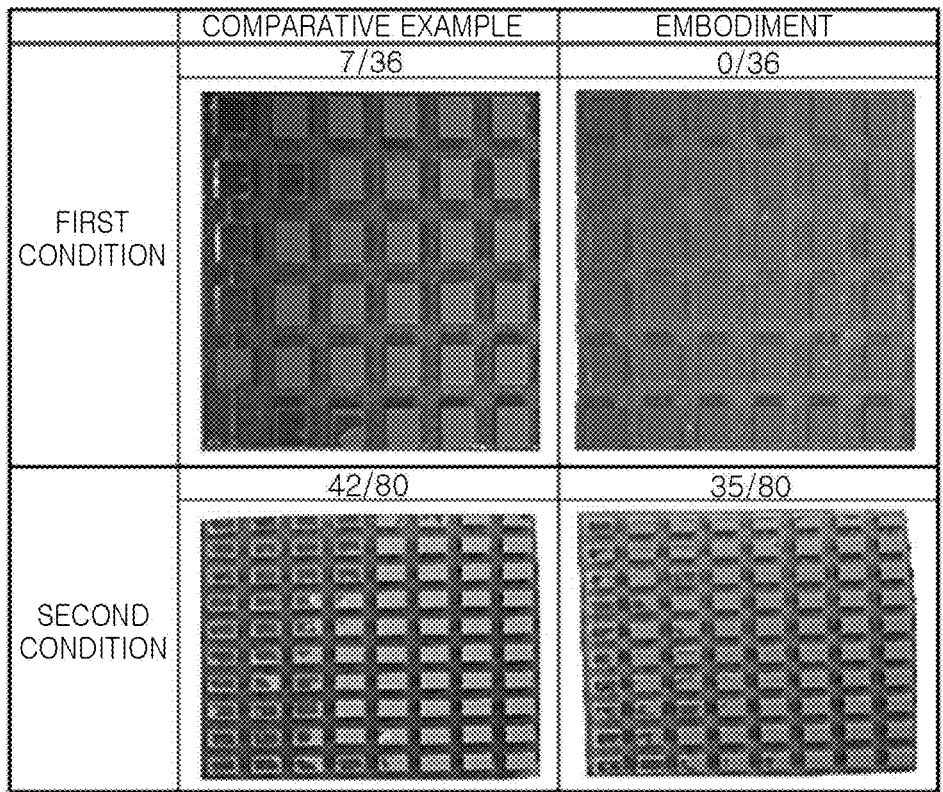
FIG. 13 is a table indicating tape test results for comparative examples and embodiments of the present disclosure.

FIG. 13 is a table indicating tape test results for a comparative example and an embodiment of the present disclosure. Under the first condition, a tape having an adhesive force of 1000 gf was attached to the side margin portion forming sheet in a direction parallel to the second direction, and the tape was peeled from the side margin portion forming sheet at a peeling speed of 3000 mm/s. Under the second condition, a tape having an adhesive force of 2200 gf was attached to the side margin portion forming sheet in a direction parallel to the first direction, and the tape was peeled from the side margin portion forming sheet at a peeling speed of 5000 mm/s. Thereafter, among sample chips of the comparative example and the embodiment, the number of sample chips in which the sheet for forming the side margin portion was peeled off from the ceramic chip was measured.

Referring to FIG. 13, under the first condition, among a total of 36 sample chips in the comparative example, peeling of the sheet for forming the side margin portion occurred in 7 sample chips, but in the embodiment, there was no sample chip in which peeling of the sheet for forming the side margin portion occurred. Under the second condition, in the comparative example, among a total of 80 sample chips, there were 42 sample chips in which peeling of the sheet for forming the side margin portion occurred, but in the embodiment, there were 35 sample chips in which peeling of the sheet used to form the side margin portion occurred. Accordingly, the sheet for forming the side margin portion in the embodiment had excellent adhesive strength by including polydopamine, as compared to the comparative example.

<Measuring Elastic Modulus>

Thereafter, an elastic modulus of the sheet for forming the side margin portion was measured. The elastic modulus was measured through a linear slope of the stress-strain curve graph measured using a universal test machine (UTM).

Figure 14:
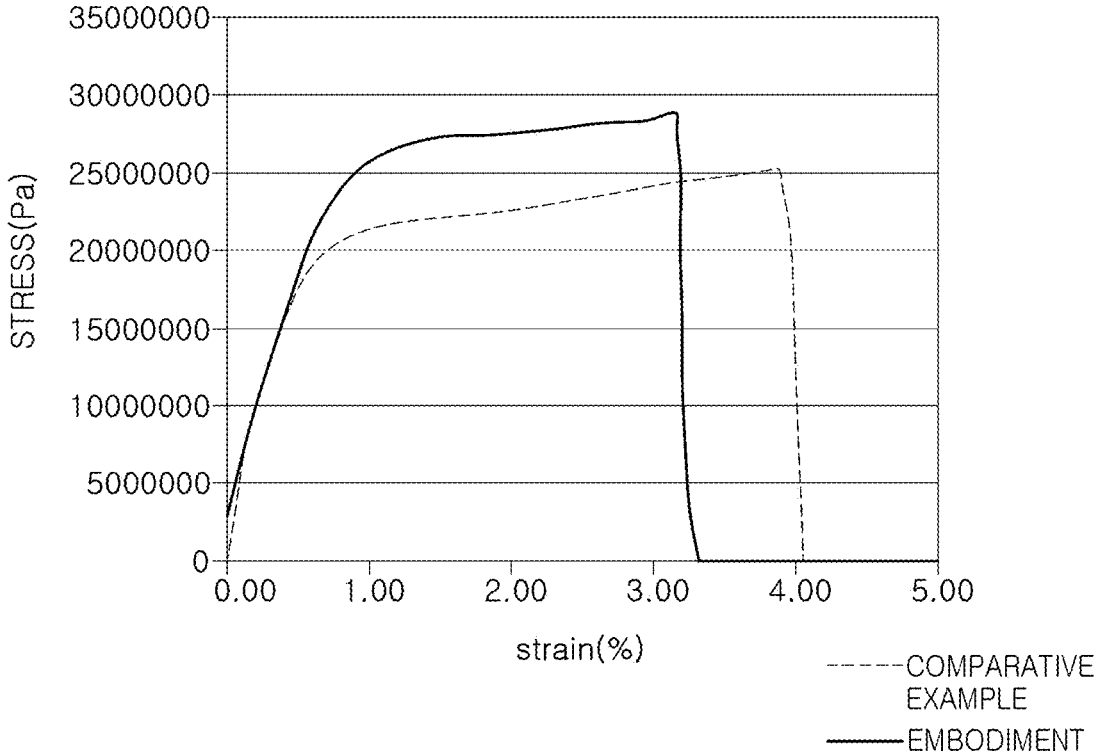
FIG. 14 is a graph indicating stress-strain curves of a comparative example and an embodiment of the present disclosure.

FIG. 14 is a table indicating stress-strain curves of a comparative example and an embodiment. Referring to FIG. 14, an elastic modulus of the sheet for forming the side margin portion of the comparative example was 36.7 MPa, and an elastic modulus of the sheet for forming the side margin portion of the embodiment was 38.6 MPa. Accordingly, the sheet for forming the side margin portion in the embodiment had a higher elastic modulus by including polydopamine, as compared to the comparative example.

<Moisture Resistance Reliability Test>

Sample chips of the embodiment and the comparative example were prepared through the above-described manufacturing method. The sample chip in the moisture resistance reliability test was in a state in which the ceramic chip having the sheet for forming the side margin portion attached was fired, and the external electrode was also formed. Thereafter, a temperature of 85° C., a humidity of 85° C., and a voltage of 3.75V were applied to each of 400 sample chips of the comparative examples and the embodiments for 8 hours, and changes in insulation resistance IR was measured.

Figure 15A:
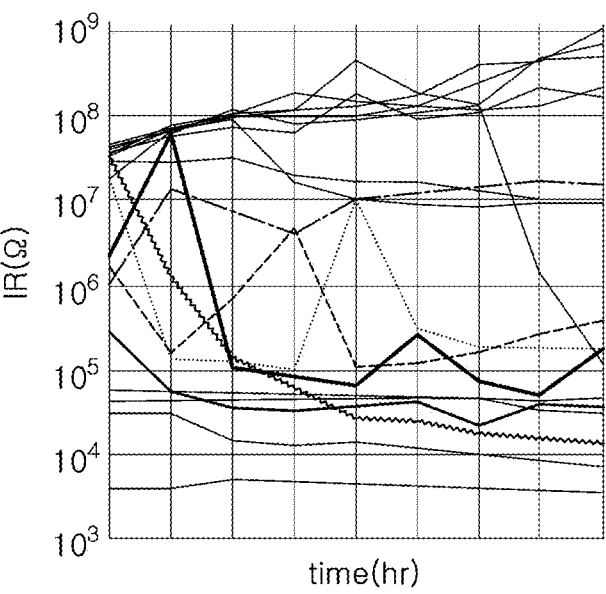
FIG. 15A is a graph indicating results of reliability evaluation of comparative examples.
Figure 15B:
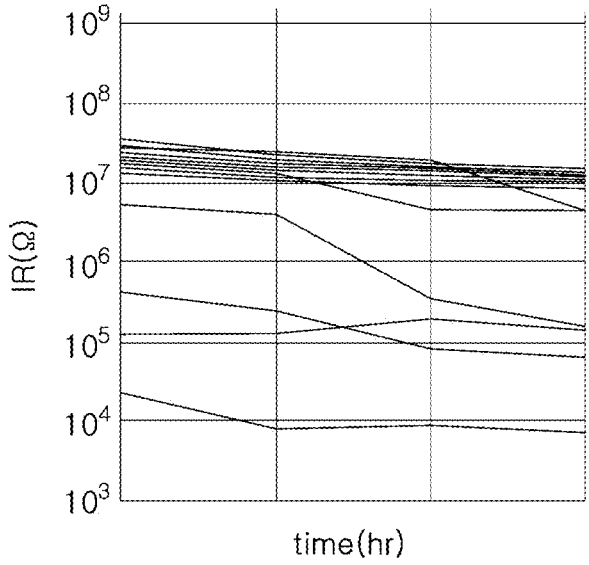
FIG. 15B is a graph indicating results of reliability evaluation of an embodiment of the present disclosure.

FIG. 15A is a graph indicating results of reliability evaluation of comparative examples. FIG. 15B is a graph indicating results of reliability evaluation of an embodiment of the present disclosure. Referring to FIG. 15A and FIG. 15B, in the comparative example, in contrast to the embodiment, there were a plurality of sample chips of which insulation resistance IR changes rapidly. In other words, in the embodiment, moisture resistance reliability was further improved as compared to the comparative example, which is because, as the nitrogen-doped carbonized polydopamine in the embodiment has hydrophobicity, nitrogen-doped carbonized polydopamine may act as a barrier against moisture penetration when located at the grain boundary.

According to the aforementioned embodiments, a multilayer electronic component having excellent mechanical strength and moisture resistance reliability may be provided.

The embodiments do not necessarily limit the scope of the embodiments to a specific embodiment form. Instead, modifications, equivalents and replacements included in the disclosed concept and technical scope of this description may be employed. Throughout the specification, similar reference numerals are used for similar elements.

In the embodiments, the term "embodiment" may not refer to one same embodiment, and may be provided to describe and emphasize different unique features of each embodiment. The above suggested embodiments may be implemented do not exclude the possibilities of combination with features of other embodiments. For example, even though the features described in an embodiment are not described in the other embodiment, the description may be understood as relevant to the other embodiment unless otherwise indicated.

The terms "first," "second," and the like may be used to distinguish one element from the other, and may not limit a sequence and/or an importance, or others, in relation to the elements. In some cases, a first element may be referred to as a second element, and similarly, a second element may be referred to as a first element without departing from the scope of right of the example embodiments.

While the embodiments have been illustrated and described above, it will be configured as apparent to those skilled in the art that modifications and variations could be made without departing from the scope of the present disclosure as defined by the appended claims.

What is claimed is:

1. A multilayer electronic component, comprising:

a body including a dielectric layer and first and second internal electrodes disposed alternately in a first direction with the dielectric layer interposed therebetween, and including first and second surfaces opposing each other in the first direction, third and fourth surfaces opposing each other in a second direction and connected to the first and second surfaces, and fifth and sixth surfaces opposing each other in a third direction and connected to the first to fourth surfaces;

a side margin portion disposed on the fifth and sixth surfaces; and an external electrode disposed on the third and fourth surfaces, wherein the side margin portion includes polydopamine, wherein the dielectric layer either (i) is free of the polydopamine, or (ii) includes the polydopamine at a content that is less than a content of the polydopamine included in the side margin portion, and wherein an average size of plurality of dielectric grains included in the side margin portion is different from an average size of plurality of dielectric grains included in the dielectric layer.

2. The multilayer electronic component of claim 1, wherein at least a portion of the polydopamine included in the side margin portion is nitrogen-doped carbonized polydopamine.

3. The multilayer electronic component of claim 1, wherein a grain boundary is disposed between adjacent dielectric grains among the plurality of dielectric grains included in the side margin portion, and wherein the polydopamine included in the side margin portion is disposed at the grain boundary.

4. The multilayer electronic component of claim 1, wherein an average size of the plurality of dielectric grains included in the side margin portion is 160 nm or more and 190 nm or less.

5. The multilayer electronic component of claim 1, wherein, in the side margin portion, an Nis peak and a C1s peak are detected when analyzing using X-ray photoelectron spectroscopy (XPS).

6. The multilayer electronic component of claim 1, wherein, during Raman analysis of the side margin portion, a first peak is detected at a Raman shift of 1360 cm$^{-1}$ to 1380 cm$^{-1}$, and a second peak is detected at a Raman shift of 1610 cm$^{-1}$ to 1630 cm$^{-1}$.

7. The multilayer electronic component of claim 6, wherein a ratio of a maximum intensity of the first peak to a maximum intensity of the second peak is 0.01 or more and 1.50 or less.

8. The multilayer electronic component of claim 6, wherein a full width at half maximum of the first peak is 80 $cm^{-1}$ or more and 90 $cm^{-1}$ or less, and a full width at half maximum of the second peak is 100 $cm^{-1}$ or more and 110 $cm^{-1}$ or less.

9. The multilayer electronic component of claim 1, wherein, when analyzing using X-ray photoelectron spectroscopy (XPS), a N1s peak is detected in the side margin portion, and a N1s peak is not detected in the dielectric layer.

10. The multilayer electronic component of claim 1, wherein, during Raman analysis, in the side margin portion, a first peak is detected at a Raman shift of 1360 $cm^{-1}$ to 1380 $cm^{-1}$, and a second peak is detected at a Raman shift of 1610 $cm^{-1}$ to 1630 $cm^{-1}$, and in the dielectric layer, no peak is detected in at least one of Raman shifts of 1360 $cm^{-1}$ to 1380 $cm^{-1}$ and Raman shifts of 1610 $cm^{-1}$ to 1630 $cm^{-1}$.

11. The multilayer electronic component of claim 1,
wherein, during Raman analysis, in the side margin portion, a first peak is detected at a Raman shift of 1360 $cm^{-1}$ to 1380 $cm^{-1}$, and a second peak is detected at a Raman shift of 1610 $cm^{-1}$ to 1630 $cm^{-1}$, and in the dielectric layer, a third peak is detected at a Raman shift of 1360 $cm^{-1}$ to 1380 $cm^{-1}$, and a fourth peak is detected at a Raman shift of 1610 $cm^{-1}$ to 1630 $cm^{-1}$, and
wherein an intensity of the third peak is lower than an intensity of the first peak, and intensity of the fourth peak is lower than an intensity of the second peak.

12. The multilayer electronic component of claim 1, wherein a RGB value measured from the side margin portion satisfies 71≤R≤79, 71≤G≤79, and 64≤B≤72.

13. The multilayer electronic component of claim 1, wherein at least a portion of the polydopamine included in the side margin portion is nitrogen-doped carbonized polydopamine,
wherein an average size of the plurality of dielectric grains included in the side margin portion is 160 nm or more and 190 nm or less, and
wherein the dielectric layer is free of the polydopamine.

14. The multilayer electronic component of claim 13, wherein a grain boundary is disposed between adjacent dielectric grains among the plurality of dielectric grains included in the side margin portion, and
wherein the polydopamine included in the side margin portion is disposed at the grain boundary.

15. The multilayer electronic component of claim 1, wherein at least a portion of the polydopamine included in the side margin portion is nitrogen-doped carbonized polydopamine,
wherein an average size of the plurality of dielectric grains included in the side margin portion is 160 nm or more and 190 nm or less, and
wherein the dielectric layer includes the polydopamine at a content that is less than a content of the polydopamine included in the side margin portion.

16. The multilayer electronic component of claim 15, wherein a grain boundary is disposed between adjacent dielectric grains among the plurality of dielectric grains included in the side margin portion, and
wherein the polydopamine included in the side margin portion is disposed at the grain boundary.

17. A multilayer electronic component, comprising:
a body including a dielectric layer and first and second internal electrodes disposed alternately in a first direction with the dielectric layer interposed therebetween, and including first and second surfaces opposing each other in the first direction, third and fourth surfaces opposing each other in a second direction and connected to the first and second surfaces, and fifth and sixth surfaces opposing each other in a third direction and connected to the first to fourth surfaces;
a side margin portion disposed on the fifth and sixth surfaces; and
an external electrode disposed on the third and fourth surfaces,
wherein the side margin portion includes polydopamine,
wherein, when analyzing using X-ray photoelectron spectroscopy (XPS), a N1s peak is detected in the side margin portion, and a NIs peak is not detected in the dielectric layer, and
wherein an average size of plurality of dielectric grains included in the side margin portion is different from an average size of plurality of dielectric grains included in the dielectric layer.

18. The multilayer electronic component of claim 17, wherein at least a portion of the polydopamine included in the side margin portion is nitrogen-doped carbonized polydopamine, and
wherein an average size of the plurality of dielectric grains included in the side margin portion is 160 nm or more and 190 nm or less.

19. A multilayer electronic component, comprising:
a body including a dielectric layer and first and second internal electrodes disposed alternately in a first direction with the dielectric layer interposed therebetween, and including first and second surfaces opposing each other in the first direction, third and fourth surfaces opposing each other in a second direction and connected to the first and second surfaces, and fifth and sixth surfaces opposing each other in a third direction and connected to the first to fourth surfaces;
a side margin portion disposed on the fifth and sixth surfaces; and
an external electrode disposed on the third and fourth surfaces,
wherein the side margin portion includes polydopamine,
wherein, during Raman analysis, in the side margin portion, a first peak is detected at a Raman shift of 1360 $cm^{-1}$ to 1380 $cm^{-1}$, and a second peak is detected at a Raman shift of 1610 $cm^{-1}$ to 1630 $cm^{-1}$, and in the dielectric layer, no peak is detected in at least one of Raman shifts of 1360 $cm^{-1}$ to 1380 $cm^{-1}$ and Raman shifts of 1610 $cm^{-1}$ to 1630 $cm^{-1}$, and
wherein an average size of plurality of dielectric grains included in the side margin portion is different from an average size of plurality of dielectric grains included in the dielectric layer.

20. The multilayer electronic component of claim 19, wherein at least a portion of the polydopamine included in the side margin portion is nitrogen-doped carbonized polydopamine, and
wherein an average size of the plurality of dielectric grains included in the side margin portion is 160 nm or more and 190 nm or less.

* * * * *